United States Patent [19]
Roseman et al.

[11] Patent Number: 6,153,942
[45] Date of Patent: *Nov. 28, 2000

[54] STARTER/GENERATOR SPEED SENSING USING FIELD WEAKENING

[75] Inventors: Ronald W. Roseman, Walton Hills; Kevin E. Rice, Stow, both of Ohio

[73] Assignee: Lucas Aerospace Power Equipment Corp., Aorora, Ohio

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/897,368

[22] Filed: Jul. 21, 1997

Related U.S. Application Data

[63] Continuation of application No. 08/503,446, Jul. 17, 1995, abandoned.

[51] Int. Cl.[7] ............................... F02N 11/04; H02P 9/04
[52] U.S. Cl. .............................. 290/47; 290/31; 290/32; 290/34; 290/35; 290/36 R; 290/37 R
[58] Field of Search .................... 291/31, 32, 34, 291/36 R, 37 R, 47 T; 322/25

[56] References Cited

U.S. PATENT DOCUMENTS

| | | | |
|---|---|---|---|
| Re. 27,868 | 1/1974 | Porter | 290/31 |
| 3,902,073 | 8/1975 | Lafuze | 290/46 |
| 4,122,354 | 10/1978 | Howland | 290/31 |
| 4,335,344 | 6/1982 | Gant | 322/25 |
| 4,496,897 | 1/1985 | Unnewehr et al. | 322/25 |
| 5,029,263 | 7/1991 | Rozman | 318/714 |
| 5,051,670 | 9/1991 | De Piola | 318/434 |
| 5,055,764 | 10/1991 | Rozman et al. | 322/10 |
| 5,168,208 | 12/1992 | Schultz et al. | 322/25 |
| 5,363,032 | 11/1994 | Hanson et al. | 322/10 |
| 5,550,456 | 8/1996 | Shekhawat et al. | 322/25 |

FOREIGN PATENT DOCUMENTS

| | | |
|---|---|---|
| 1601197 | 10/1981 | United Kingdom . |
| 2145545 | 3/1985 | United Kingdom . |
| 2172416 | 9/1986 | United Kingdom . |

*Primary Examiner*—Elvin Enad
*Attorney, Agent, or Firm*—Bankin, Hill, Porter & Clark LLP

[57] ABSTRACT

A starter cutoff control apparatus and method for a starter/generator used on an engine includes a circuit for detecting starter/generator armature current during an engine start operation, comparing the armature current to an armature current setpoint to produce an error signal; using the error signal to produce a field weakening control signal; and a circuit for producing a starter cutoff signal as a function of the field weakening control signal.

25 Claims, 1 Drawing Sheet

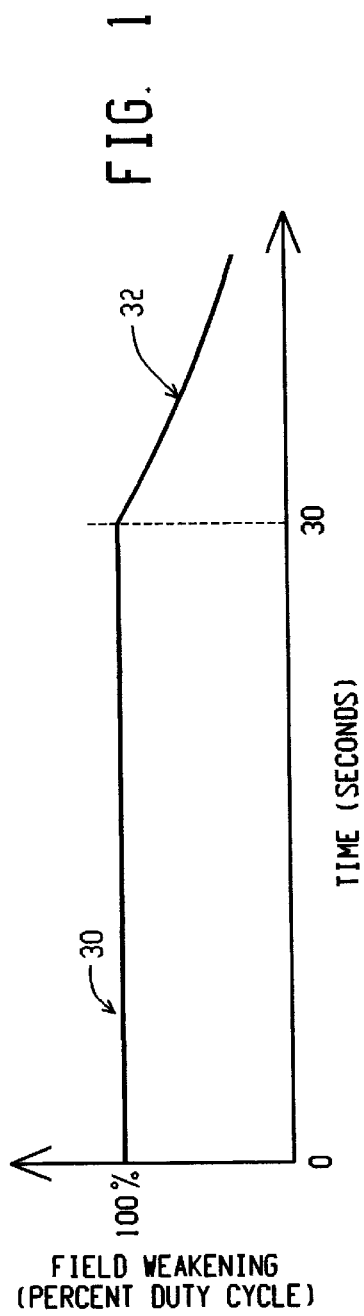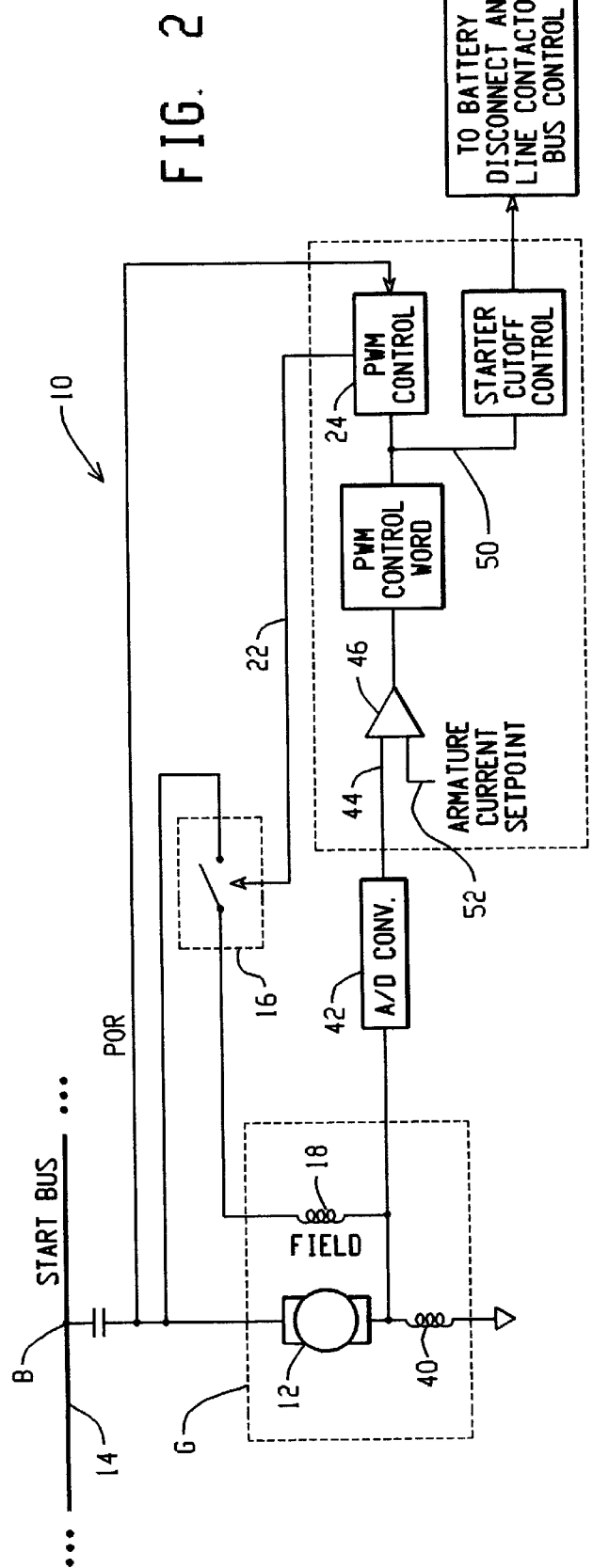

6,153,942

STARTER/GENERATOR SPEED SENSING USING FIELD WEAKENING

This application is a continuation, of application Ser. No. 08/503,446, filed Jul. 17, 1995, now abandoned.

BACKGROUND OF THE INVENTION

The invention relates generally to methods and apparatus for controlling operation of starter/generators such as are often used on engines. More particularly, the invention relates to starter/generator speed sensing control, for example, during an engine start cycle for starter cutoff.

It is well known to use generators as starters for motors and engines. For example, in the aerospace industry, DC generators are commonly used as engine starters on small aircraft engines such as gas turbine engines. After the engine is started, the generator typically is used as an electrical power source for the aircraft.

As a starter/generator for an engine, the generator armature is supplied electrical energy typically from a starter battery. The generator develops substantial torque initially to begin turning the engine.

As the generator speed increases, the generator begins to produce an armature output voltage, commonly referred to as back EMF. Increasing back EMF has the effect of reducing the armature current and hence the starting torque. In some applications, the back EMF may build too quickly before the engine is at idle speed. In such cases, it is generally known to implement a field weakening function in which the field current is forced lower, thereby causing the back EMF to decrease. This in turn increases the armature current to maintain a desired starting output torque from the generator.

Eventually, the starter/generator and engine reach a sufficient speed for full engine operation to begin. At such time, the battery is disconnected from the generator and the generator is connected to a main bus or load, typically through closure of a contactor switching mechanism. Thereafter, the generator functions as a power source driven by the running engine. This switching from a starter to a generator is commonly referred to as starter cutoff. In addition to wanting adequate engine speed at starter cutoff, adequate generator speed is also needed to permit proper voltage regulation of the generator output, as well as to assure that the generator can accommodate the expected load after it is connected to the main bus.

Typically, starter cutoff is accomplished by the use of a separate generator speed sensor, such as a LAPSA 23072-1400. Although the use of such a device permits accurate control of starter cutoff at a selected generator speed, the sensors tend to be expensive, high maintenance items. Also, typical systems are designed so that if the speed sensor is inoperative or otherwise unavailable as a control device, engine start is abnormal or aborted.

The objectives exist, therefore, to provide reliable starter cutoff operation and generator speed sensing functions that can be used as an alternative to or backup for a conventional generator speed sensor.

SUMMARY OF THE INVENTION

To the accomplishment of the foregoing objectives, the invention contemplates, in one embodiment, starter cutoff apparatus for a starter/generator used on an engine, comprising means for developing a field weakening control signal during a start operation, and detector means for producing a starter cutoff signal as a function of said field weakening control signal.

The invention also contemplates the methods embodied in the use of such apparatus, as well as in another embodiment, a method for controlling starter cutoff for an engine starter/generator without requiring the use of a separate generator speed sensor, comprising the steps of:

a. detecting the armature current during an engine start operation;

b. producing a field weakening control signal based on the detected armature current; and c. producing a starter cutoff control signal based on said field weakening control signal.

These and other aspects and advantages of the present invention will be readily understood and appreciated by those skilled in the art from the following detailed description of the invention with the best mode contemplated for practicing the invention in view of the accompanying drawings.

BRIEF DESCRIPTION OF THE DRAWING

FIG. 1 is a simplified graphical representation of starter/generator field current PWM drive signal versus time for a typical starter/generator during field weakening; and FIG. 2 is a schematic diagram of a circuit that embodies the teachings of the invention.

DETAILED DESCRIPTION OF THE INVENTION

With reference to the drawing, a starter cutoff control and speed sensing apparatus for a starter/generator is generally designated with the numeral 10. Although the invention is described herein with particular reference to a DC shunt generator such as can be used conveniently as a starter/generator for an aircraft engine, this is for purposes of explanation and should not be construed in a limiting sense. Rather than being application specific, the invention is more broadly construed as being directed to monitoring and control apparatus and methods for speed sensing and/or starter cutoff control for starter/generators. As used herein, the term "starter/generator" simply refers to the fact that a generator such as described herein can be used as a starter for an engine, and after engine start can be used as a power plant for the aircraft. However, reference to the use of the invention with such a starter/generator is not intended to be limited only to generators used as starters.

It is noted at this time that the generator G is not shown in detail in the drawings because the particular generator design forms no critical part of the present invention. In the described embodiment, the generator is a DC shunt generator such as generator 23080-013 available from Lucas Aerospace Power Equipment Corporation. However, the invention can also be used conveniently with compound generators, for example.

Generally, a generator "G" will have the field windings disposed on a stator assembly and the armature windings disposed on the armature rotor. In a generator, when used as a starter, a power source such as a battery (indicated by the letter B in FIG. 2) typically is connected to the armature 12 through a start bus and contactor 14. The battery is also connected by means of a switching device 16 such as a field transistor to the field winding 18. In a shunt type generator such as described in the exemplary embodiment herein, the field is supplied by the armature 12 through the switching device 16. In this case, the field current is controlled by pulse width modulation (PWM) of the duty cycle of the field transistor 16 gate drive signal 22.

A control circuit 20 is typically provided with or coupled to the generator for performing various monitoring and control functions. The control circuit can be, for example, a microprocessor-based controller such as shown and described in co-pending U.S. patent application Ser. No. 08/131,196 filed on Oct. 1, 1993 for MICROPROCESSOR CONTROLLER FOR STARTER/GENERATOR, which application is owned in common by the assignee of the present invention, the entire disclosure of which is fully incorporated herein by reference. Those skilled in the art will understand, however, that the invention can be used with many different types of control circuits and algorithms. In some applications, the control circuit 20 can be realized with discrete circuitry of conventional design without the need for a microprocessor or similar controller. For purposes of the present invention, the basic functions carried out by the control circuit are: 1) regulate the generator output voltage (generally noted as the point of regulation "POR"); 2) provide a field weakening function during an engine start sequence; and 3) control the field current in response to the output voltage regulation requirements, as well as in response to the speed of the generator and the load the generator is connected to. This is not intended to be an exhaustive nor required list of control functions performed by the circuit 20, and those skilled in the art will readily appreciate that a typical control circuit 20 for a starter/generator can include additional or fewer monitoring and control functions such as starter torque limiting, fault detection and so forth. The speed sensing concept of the present invention could alternatively be realized as a discrete circuit separate from or coupled to a main control circuit for the generator (not shown).

Regulation of the generator voltage at the POR can be realized in the control circuit 20 by any of the conventional and well known regulator designs and/or control algorithms. The voltage regulation function 24 is used to control the duty cycle of the field transistor 16 drive signal thus controlling the field excitation current and the armature output voltage.

The field weakening function can be implemented in a conventional manner as a control process for the circuit 20 well known to those skilled in the art. In general, field weakening refers to the process of reducing the field current during engine start while the generator is operating as a starter motor for the engine. During such operation, back EMF is produced by the spinning armature, and this back EMF has the effect of reducing armature current thus reducing starting torque. During an engine start sequence it is desirable to maintain an adequate starting torque until the engine reaches idle speed and the generator is spinning at a sufficient speed for generator regulation and load capacity.

As is known, back EMF is a function of generator speed and field excitation current. As the starter/generator speed builds, the increasing back EMF without field weakening would in time equal or exceed the starter battery voltage with a corresponding loss of starter torque, possibly before the generator reaches sufficient speed for generator operation or engine operation. In some control designs, when the starter speed rises to within a predetermined threshold level, the battery is disconnected from the generator and the generator is connected to the main load bus, an event generally referred to as starter cutoff. Starter cutoff may also be controlled by monitoring the generator speed using a discrete speed sensor.

In a shunt generator such as the example herein, by reducing the field current with a field weakening function, a resultant reduction in the back EMF occurs which in turn increases or maintains starter torque without starter cutoff for a selectable time period; or for systems that use a speed sensor, field weakening can be used until the generator speed exceeds a preset detectable threshold for starter cutoff. Typically, field weakening is implemented so as to maintain a generally constant armature current and hence starter torque during a start sequence.

In accordance with one aspect of the invention then, starter cutoff is controlled by detecting the field weakening level and producing a starter cutoff control signal in response thereto. As illustrated in a representative manner in FIG. 1, field current (as a function, for example, of drive signal PWM duty cycle) is at a maximum 100% duty cycle during the early portion 30 of a start cycle operation because maximum torque is desired.

After a period of time, for example thirty seconds as shown in the drawing, back EMF may have built up to the point where starter torque may be significantly reduced. In order to maintain starter torque, the field current is reduced by reducing the duty cycle of the field transistor drive signal 22, thus reducing back EMF and maintaining armature current at a desired level, during a field weakening period 32, which operation maintains starter torque until starter cutoff speed is achieved.

As noted herein, conventional speed sensors are expensive and can be high maintenance items. Also, in some control designs, loss of a speed sensor results in starter shutdown. As an alternative to the use of a speed sensor, and in accordance with the invention, the control circuit 20 is provided with a field weakening level sensing function. This function is accomplished in the described embodiment by monitoring the voltage drop across an interpole winding 40. This voltage may be used to represent the armature current at any point of time or averaged over selected time periods. The interpole winding 40 voltage is input to a conventional analog to digital converter 42 to permit digital processing by the control circuit 20, if so desired. Although in the described embodiment the control circuit 20 is realized in the form of a microprocessor-based system, those skilled in the art will readily appreciate and understand that equivalent function and operation can be realized using analog circuits as well as discrete digital circuits.

The control circuit 20 uses the armature current information as part of a conventional field weakening function to determine the appropriate field weakening level. The control circuit 20 includes an error amplifier 46 which compares the detected armature current (as represented by the digitized interpole winding voltage 44) to a desired and predetermined armature current setpoint reference 52. The armature current setpoint is selected as the desired armature current used to maintain adequate starting torque for the engine. The error signal output from the amplifier 46 is input to the PWM control circuit 24 to control the appropriate field weakening level so as to maintain the armature current at the desired setpoint 52 in a closed loop control operation. This field weakening level is determined by adjusting the PWM drive 24 duty cycle. For example, if the armature current is below the required setpoint level, the control circuit 20 reduces the PWM duty cycle from the PWM control circuit 24. This reduced duty cycle causes a reduced field current which causes a drop in back EMF so that the armature current increases towards the setpoint value.

In the described embodiment, the output of the converter 42 can be, for example, a multibit digital word. The control circuit 20 responds to the armature current as represented by this multibit word and develops, based on the output of the error amplifier 46, a digital word for controlling, via the PWM control circuit 24, the PWM duty cycle for the field transistor drive signal 22.

As the starter/generator speed increases, the control circuit 20 continuously varies, by changing the PWM digital control word, the starter/generator field current, maintaining the required starter torque by maintaining the armature current at the desired setpoint 52. Typically, increasing speed of the starter/generator produces a field weakening function by which the duty cycle of the PWM signal 22 is continually reduced, because back EMF tends to increase with increasing speed. Thus, the PWM control word correspondingly is continuously reduced and hence can be used as an accurate analog of the starter/generator speed. In other words, during field weakening the PWM control signal 22 duty cycle, or equivalently in the described embodiment the digital word used to control the PWM duty cycle, varies with starter/generator speed in a definable manner. As represented by the control signal 50 in FIG. 2, the control circuit 20 monitors the PWM control word, or alternatively the PWM duty cycle (or analog equivalents to name other examples) as an indication of the starter/generator speed and produces a starter/generator cutoff control signal 50 when the starter/generator reaches a selectable speed at which point a normal starter cutoff can occur. This selectable speed corresponds to a specific PWM duty cycle as established by the PWM control word. Thus, in this example, the PWM digital control word can be used to initiate starter cutoff. Use of this control word is particularly convenient with digital control circuits 20 because the control word is already developed as part of the field weakening control function.

The starter cutoff control signal 50 can be used as a control for disconnecting the starter battery B from the generator and connecting the generator to the load in a known manner (not shown).

The invention thus provides a simple and convenient alternative speed sensing arrangement that can be used for controlling starter cutoff without the use of a conventional speed sensor. The invention can also be used as a backup for a conventional speed sensor so that engine start can be automatically terminated in cases when the speed sensor signal or operation is lost.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. Starter cutoff apparatus for a starter/generator used on an engine, comprising means for developing a field weakening control signal from a coil within the starter/generator during a start operation, and detector means for producing a starter cutoff signal in response to said field weakening control signal; the starter/generator switching from starter operation to operation as a generator in response to said starter cutoff signal.

2. The apparatus of claim 1 wherein said detector means produces said starter cutoff signal when said field weakening control signal indicates a generator speed at which starter operation is not required.

3. The apparatus of claim 1 wherein said detector means produces said starter cutoff signal when said field weakening control signal indicates starter torque has dropped below a selected level.

4. The apparatus of claim 1 wherein said means for developing a field weakening control signal comprises an interpole winding and an error circuit that monitors the voltage drop across the interpole winding, said error circuit producing an error signal that represents a difference between armature current and an armature current setpoint, said error signal input to a field weakening control circuit.

5. The apparatus of claim 4 wherein said field weakening control circuit controls field weakening by operating to maintain a generally constant armature current as generator speed increases by controlling a field current drive signal to reduce field excitation current.

6. The apparatus of claim 5 wherein said starter cutoff control signal is produced based on said error signal used to control said field weakening.

7. The apparatus of claim 4 further comprising means for digitizing said interpole winding voltage and means for producing a digital control word that represents said error signal, said control word being used by said field weakening control circuit to control field current, said control word representing starter/generator speed.

8. The apparatus of claim 7 wherein said control word represents starter/generator speed as a function of field current drive which decreases as speed increases.

9. The apparatus of claim 8 wherein said control word is used to effect starter cutoff when said word indicates the starter/generator speed has reached a selected level.

10. The apparatus of claim 1 wherein said detector means comprises a field weakening circuit that regulates armature current by decreasing field current as speed and back EMF increase.

11. The apparatus of claim 10 wherein the field weakening circuit operates to decrease field current during engine start to maintain a relatively constant armature current that otherwise would be reduced by back EMF.

12. The apparatus of claim 11 wherein the field weakening circuit controls field current using a PWM gate drive signal to a switching transistor.

13. The apparatus of claim 1 as part of an aircraft engine starter circuit used on an aircraft engine for starter cutoff control without the use of a generator speed sensor.

14. The apparatus of claim 1 in combination with an aircraft engine for starter cutoff control as a backup/auxiliary generator speed sensor.

15. In combination, a starter/generator for an engine, and a starter cutoff control apparatus comprising a field weakening control circuit for the starter/generator that operates to maintain a generally constant armature current in the starter/generator as starter/generator speed increases; and a cutoff control circuit for producing a starter cutoff signal in response to a field weakening control signal produced by said field weakening control circuit; the starter/generator switching from starter operation to operation as a generator in response to said starter cutoff signal.

16. The combination of claim 15 wherein the engine is an aircraft turbine engine and the starter/generator is a DC shunt generator.

17. The combination of claim 15 wherein the starter cutoff apparatus is used in place of a conventional generator speed sensor for controlling starter cutoff.

18. The combination of claim 15 wherein said field weakening control circuit comprises means for detecting armature current and producing an error signal that represents a difference between the armature current and an armature current setpoint, said field weakening control circuit controlling field current based on said error signal; said field weakening control circuit controlling field current by adjusting a pulse width modulated (PWM) gate drive signal of a field transistor.

19. The combination of claim 18 wherein said field weakening control circuit produces a digital word that corresponds to said error signal and is used to control the PWM field drive signal.

20. The combination of claim 19 wherein said cutoff control circuit produces the starter cutoff signal when said digital word indicates that the starter/generator speed is adequate for starter cutoff.

21. The method of claim 18 wherein said field weakening control signal represents engine speed and/or starter torque as a function of field current needed to maintain a generally constant armature current.

22. The combination of claim 15 wherein the starter cutoff signal controls disconnect of a starter battery from the starter/generator.

23. A method for controlling starter cutoff for an engine starter/generator without requiring the use of a generator speed sensor, comprising the steps of:

a. detecting the armature current of the starter/generator during an engine start operation;
   b. producing a field weakening control signal for weakening a field within the starter/generator based on the detected armature current of the starter/ generator;
   c. producing a starter cutoff control signal in response to said field weakening control signal;

the starter/generator switching from starter operation to operation as a generator in response to said starter cutoff signal.

24. The method of claim 23 further comprising the step of using the starter cutoff signal to control disconnect of a starter battery from the starter/generator.

25. A method for sensing speed of a starter/generator comprising the steps of:

monitoring the armature current of the starter/generator over a selected time and comparing the armature current to an armature current setpoint to produce an error signal;
   producing a field weakening control signal for weakening a field within the starter/generator in response to said error signal; and
   producing a starter cutoff control signal in response to said field weakening control signal;

the starter/generator switching from starter operation to operation as a generator in response to said starter cutoff signal.

* * * * *